United States Patent Office 3,444,104
Patented May 13, 1969

3,444,104
EXPANDABLE POLYMERS
Richard H. Immel, Osborne, Sewickley, and Paul B. Nelson, Aliquippa, Pa., assignors to Sinclair-Koppers Company, a partnership of Delaware
No Drawing. Filed Feb. 16, 1966, Ser. No. 527,723
Int. Cl. C08f *47/10, 33/02*
U.S. Cl. 260—2.5                             5 Claims

ABSTRACT OF THE DISCLOSURE

Expandable polymer beads, coated with from 0.01–0.25 percent by weight of an amorphous hydrated calcium silico aluminate of ultra-fine particle size have excellent resistance to lumping during pre-expansion.

---

This invention relates generally to expandable thermoplastic material and more particularly to improved expandable styrene polymer beads which exhibit a strong anti-lumping property during pre-expansion.

Expandable beads of styrene polymer generally contain from 3 to 20 parts by weight of a blowing agent which boils below the softening point of the polymer and which will cause the beads to expand under the influence of heat. The expandable beads, which have a size range predominantly between about 10 and 40 mesh, can be prepared by the process of United States Patent No. 3,192,169. Conventionally, to make a foamed product from these beads, the beads are heated by injecting steam or other suitable heat media under pressure into a mold cavity filled with the beads to heat the beads above their softening point whereupon the beads expand to conform to the mold cavity and fuse together. The beads are generally pre-expanded as for example as described in United State Patent No. 3,023,175 before being placed in the mold because this permits the molding of finished articles of uniform density and low density.

During the pre-expansion process, the beads have a tendency to stick together and form lumps, which lumps render the beads unsuitable for molding. Heretofore, to alleviate the lumping problem, a lubricant such as, for example, silicon oil or magnesium stearate, has been added to the surface of the beads prior to pre-expansion but the amount of lubricant had to be carefully controlled. In fact, satisfactory fusion of the beads on molding is not achieved when even a slight excess over the amount of lubricant needed to prevent lumping is present. Silicon oil has the disadvantageous effect of reducing the shelf life of the beads due to a rapid loss of blowing agent and also impairing the free flowing properties of the beads in the containers because of its oily nature. Magnesium stearate has the disadvantage of being difficult to distribute evenly on the beads and, more importantly, of having a very profound deleterious effect on fusion when used in slight excess.

Surprisingly, we have found that the expandable styrene polymer beads can be made free from lumping during pre-expansion by applying to the surface thereof an amorphous hydrated calcium silico aluminate of ultrafine particle size. In accordance with this invention, expandable styrene polymer beads are coated with from 0.01–0.25 percent by weight of beads of an amorphous hydrated calcium silico aluminate of ultrafine particle size. Reasonably excessive amounts over that required to prevent lumping during pre-expansion are, of course, not economical but, on the other hand, do not impair the free flowing of the beads, the shelf life, or the fusion of the beads on molding.

The expandable beads can be coated with the calcium silico aluminate in any convenient manner, for example, by mixing the dry beads with the aluminate in conventional dry mixing equipment or by adding the aluminate to a stirred aqueous suspension of the beads, conveniently, the suspension in which the beads were prepared.

The amorphous hydrated calcium silico aluminate is a clay derivative having a typical composition analysis to be 47–50 percent by weight silicon dioxide, 6–7 percent by weight aluminum oxide and 29–31 percent by weight calcium oxide with from 11–13 percent by weight of water hydration. The compound has an ultrafine particle size (i.e., a surface area of from about 70 to 250 square meters per gram).

The invention is further illustrated by but is not intended to be limted to the following examples wherein parts are parts by weight unless otherwise indicated.

Example I

Expandable polystyrene beads were prepared by adding to a reactor equipped with a three-bladed impeller in the following order, with stirring 100 parts of styrene, 0.33 part of a catalyst (consisting of 0.23 part of benzoyl peroxide and 0.10 part of t-butyl perbenzoate), 108 parts of water, 0.05 part of a buffer tetrasodium pyrophosphate, and the reactor was heated to 92° C. over 1.5 hours. Then, 0.150 part of a suspending agent, hydroxyethyl cellulose, was added and the mixture maintained at 92° C. for an additional 3.5 hours. Thereafter, 0.2 part of a dispersing agent, Tween 20 (polyoxyethylene sorbitan monolaurate) and over a period of 1.5 hours 8.5 parts of the blowing agent, n-pentane, were added. The temperature of the suspension was then raised to 115° C. over a period of 0.5 hour and maintained at 115° C. for an additional 4 hours to complete the polymerization of the monomer and the impregnation of the blowing agent into the particles. The slurry was divided into aliquots A and B.

Example II

Aliquot A of Example I was divided into three portions. One portion A1 was set aside. To the second portion A2 there was added 0.01 part by weight of polymer of anti-lumping agent, amorphous hydrated calcium silico aluminate (50% $SiO_2$, 6–7% $Al_2O_3$, 30% CaO, 13% $H_2O$, surface area 250 m.$^2$/gram), and the slurry was stirred with a three-bladed impellor for 15 minutes to thoroughly coat the particles with the anti-lumping agent. The particles were then dewatered, washed with water and air dried. To the third portion, A3, there was added .02 part by weight of polymer of the aluminate, anti-lumping agent and the slurry was stirred for 15 minutes after which the particles were dewatered, washed with water and air dried. Each portion, A1, A2, and A3 was separately pre-expanded in a Rodman pre-expander as described in United States Patent No. 3,023,175 using in each case a steam pressure of 14 p.s.i.g. and feed rate of 250 lbs./hr. The pre-expanded beads having a bulk density of 1.2 lbs./cu. ft. were recovered from the bead hopper, were allowed to air dry in paper containers for approximately 18 hours, and then were screened through a No. 3½ mesh U.S. Standard Sieve. The percent lumping was determined from the weight of the beads which were retained on the screen. Portion A1, the beads containing no anti-lumping agent, had 17 percent by weight of lumps. Portions A2 and A3, the beads containing respectively 0.01 and 0.02 percent by weight of calcium silico aluminate, had no lumps (no beads retained on the 3½ mesh screen). Some of each portion of the pre-expanded beads were placed in individual 5 x 5 x ⅜ inch molds and the molds placed between the platens of a conduction press heated to a temperature of 250° F. where the beads were heated to expand them and cause them to fuse together. The bead-to-bead fusion of the foam block which had a density of 1.2 lbs./cu. ft. was excellent in each case.

Example III

Aliquot B of Example I was centrifuged to remove the aqueous medium. The beads were washed with water and air dried on trays. The expandable polystyrene beads of aliquot B were divided into five portions. The portion B1 was set aside. To the other four portions, B2, B3, B4 and B5, were added the amounts of anti-lumping agent (amorphous hydrated calcium silico aluminate same as in Example I) which are shown in Table I and each portion of polystyrene and anti-lumping agent were thoroughly mixed in a ribbon blender for 5 minutes. Each portion was separately expanded in the Rodman pre-expander at a steam pressure of 12 p.s.i.g. at a rate of 300 lbs./hr. to a bulk density of about 1.25 lbs./cu. ft. The amount of lumps as determined by the procedure of Example II is recorded in Table I. The portions of the pre-expanded beads were placed in individual 5 x 5 x ⅜ inch molds and the molds placed between the platens of a conduction press at a temperature of 250° F. where the beads were heated to expand them and cause them to fuse together. The results are listed in Table I.

TABLE I

| Portion Number | Percent by weight Calcium Silico Aluminate | Lumping on Pre-Expansion | Fusion on Molding |
| --- | --- | --- | --- |
| B1 | | 17.0 | Good. |
| B2 | 0.01 | Nil | Do. |
| B3 | 0.05 | None | Do. |
| B4 | 0.10 | None | Do. |
| B5 | 0.25 | None | Fair. |

It can be seen that amounts of anti-lumping additive of 0.01 was sufficient to virtually eliminate the lumping problem and that amounts greatly in excess of this (up to 25 times as much of the additive as was needed to eliminate the lumping problem) could be used before any effect on the fusion properties of the particles became evident.

Example IV

To a vessel equipped with a three-bladed impellor there was added 100 parts of the monomer, styrene, containing 0.45 part of a catalyst, comprising 0.3 part benzoyl peroxide and 0.15 part t-butyl perbenzoate, 102 parts of water, 0.10 part of the buffer, tetrasodium pyrophosphate, 2 percent by weight based on styrene of the self-extinguishing agent, tris - (2,3-bromopropyl)phosphate, and 0.35 percent by weight based on styrene of a peroxide synergist, 2,5-t-butyl peroxy-2,5-dimethyl hexane. The mixture was stirred by a three-bladed impellor at a speed of 200 r.p.m., heated to 92° C. and maintained at that temperature. Approximately 80 minutes after reaching 92° C., 0.10 part of the suspending agent, hydroxyethyl cellulose, was added. After an additional 220 minutes at 92° C., there was added 0.12 part of dispersing agent, polyoxyethylene sorbitan monolaurate, and 8.5 parts of a blowing agent which was a 50:50 by volume mixture of isopentane and n-pentane. The addition of the blowing agent took 30 minutes. The temperature was raised to 115° C. during 30 minutes and maintained at 115° C. for 240 minutes after which the slurry was cooled and the beads separated from the aqueous suspension by centrifuging, washed with water, and air dried. The product polymer beads were divided into two portions C and D. Portion C was set aside. The other portion D was placed in a ribbon blender and there was added 0.05 percent by weight of the anti-lumping additive amorphous calcium silico aluminate having a composition the same as that of Example II and a surface area of 70 square meters per gram and the anti-lumping additive and polymer beads were thoroughly mixed in the blender which took 10 minutes. Each portion of beads was separately pre-expanded in the Rodman pre-expander at a steam pressure of 15 p.s.i.g. at a rate of 200 lbs./hr. to a bulk density of about 1.0 lbs./cu. ft. The portion C that contained no additive lumped severely, having 10 percent by weight of lumps and the beads subsequently plugged the machine before the entire portion could be pre-expanded. The portion D of the beads that contained the anti-lumping additive when pre-expanded contained essentially no lumps.

Example V

To a 2500 gallon reactor there was charged consecutively 100 parts of the monomer, styrene, 0.45 part of a catalyst comprising 0.30 part benzoyl peroxide, 0.15 part t-butyl perbenzoate, 102 parts of water and 0.1 part of the buffer, tetrasodium pyrophosphate. The mixture was stirred by a three-bladed impellor at a speed of 65 r.p.m., heated to 92° C. and maintained at that temperature. Approximately 80 minutes after reaching 92° C., 0.175 part of the suspending agent, hydroxyethyl cellulose, was added and the impellor speed was increased to 80 r.p.m. Approximately 10 minutes after the hydroxyethyl cellulose addition was completed, there was added 0.2 part of ethylene-bis-stearamide as a paste contained in styrene (prepared by stirring up 0.4 part of amide with 1.5 parts of styrene). Heating was continued for 270 minutes and then there was added 0.1 part of the dispersing agent, polyoxyethylene sorbitan monolaurate, and then 8.5 parts of the blowing agent, n-pentane, which took 30 minutes. The polymerization was then completed and the beads impregnated with the blowing agent by raising the temperature of the slurry to 115° C. for 4 hours. Thereafter the mixture was cooled to room temperature and the slurry was divided into six portions E, F, G, H, I and J. Portion E was set aside. To the other five portions there was added, with stirring, the amount of anti-lumping agent, amorphous hydrated calcium silico aluminate, having the same composition and particle size as that used in Example II shown in Table II. After the stirring of each portion had continued for 10 minutes all the portions of beads were dewatered, washed with water and air dried. Each portion of the beads was separately pre-expanded in a Rodman pre-expander at a stream pressure of 15 p.s.i.g. at a rate of 300 lbs./hr. to a bulk density of about 1.1 lbs./cu. ft. The lumping of each portion was determined by the procedure of the Example II and the results recorded in Table II below.

TABLE II

| Portion Number | Percent by Weight Calcium Silico Aluminate | Percent by Weight Lumps |
| --- | --- | --- |
| E | | 4.40 |
| F | 0.020 | 0.48 |
| G | 0.050 | 0.43 |
| H | 0.075 | 0.08 |
| I | 0.100 | 0.05 |
| J | 0.150 | Nil |

It can be seen from the results that whereas the untreated portion E had 4.4 percent lumps, the addition of 0.075 percent by weight of anti-lumping agent virtually eliminated the problem in portion H. The portion J containing 0.15 percent by weight of anti-lumping agent was placed in a 20 x 20 x 12 inch mold cavity which was surrounded by a steam chest. Steam was injected into the mold for 30 seconds to cause the beads to expand and fuse together. The bead-to-bead fusion of the resulting foam block was excellent and the time required to cool the foam to a non-shrinking self-sustaining structure was 7 minutes.

While the foregoing examples discuss styrene monomer, it is to be understood that other vinyl aromatic monomers can be employed in the process and product of the invention and the term styrene polymer as used herein includes a variety of homopolymers and copolymers derived from vinyl aromatic monomers including styrene, divinyl benzene, isopropyl styrene, alpha-methyl styrene, nuclear dimethyl styrene, chlorostyrene, vinyl naphthalene, etc. as well as polymers prepared by the copolymerization of a vinyl aromatic monomer with monomers such as butadiene and acrylonitrile wherein the vinyl aromatic monomer is present in at least 50 percent by weight.

The foregoing has described novel expandable styrene polymers and their method of preperation whereby the problem of lumping on pre-expansion has been solved without the heretofore encountered difficulties of other ant-ilumping systems which harm the fusion properties of the expandable beads when used in slight excess and therefore it has not been possible to consistently obtain commercially acceptable moldings.

We claim:

1. Expandable styrene polymer beads which will not lump during pre-expansion, comprising styrene polymer beads that contain a blowing agent and that have on their surface from 0.01–0.25 part by weight per hundred parts by weight of beads of finely divided amorphous hydrated calcium silico aluminate.

2. The composition of claim 1 wherein said aluminate has a surface area of from about 70 to 250 square meters per gram.

3. The composition of claim 2 wherein the aluminate analysis is approximately 47–50 percent by weight silicon dioxide, 6–7 percent by weight aluminum oxide, 29–31 percent by weight calcium oxide, and 11–13 percent by weight of water.

4. A method of rendering expandable styrene polymer beads non-lumping on pre-expansion which comprises applying from 0.01–0.25 part by weight per hundred parts by weight of a finely divided amorphous hydrated calcium silico aluminate to the surface of said particles.

5. The method of claim 3 in which the additive is coated on the beads by adding the aluminate to the aqueous slurry of polymerized beads in which said beads were prepared.

References Cited

UNITED STATES PATENTS

| | | |
|---|---|---|
| 3,248,314 | 4/1966 | Nahin. |
| 3,296,154 | 1/1967 | Ferrigno. |
| 3,300,437 | 1/1967 | Ferrigno. |
| 3,301,812 | 1/1967 | Ferrigno. |
| 3,304,274 | 2/1967 | Eng. |

SAMUEL H. BLECH, *Primary Examiner.*

MORTON FOELAK, *Assistant Examiner.*

U.S. Cl. X.R.

117—100; 260—28.5, 29.6, 45.7